United States Patent [19]

Iwasyk

[11] 3,948,862

[45] Apr. 6, 1976

[54] CONTINUOUS PROCESS FOR PREPARING ALIPHATIC POLYCARBONAMIDES

[75] Inventor: John M. Iwasyk, Wilmington, Del.

[73] Assignee: E. I. Du Pont de Nemours and Company, Wilmington, Del.

[22] Filed: May 6, 1974

[21] Appl. No.: 467,145

[52] U.S. Cl. ............................ 260/78 R; 260/95 C
[51] Int. Cl.² ........................................ C08G 69/28
[58] Field of Search ............................ 260/78 R

[56] References Cited
UNITED STATES PATENTS

| 2,361,717 | 10/1944 | Taylor | 260/78 R |
| 2,689,839 | 9/1954 | Heckert | 260/78 R |
| 3,193,535 | 7/1965 | Carter | 260/78 R |
| 3,286,992 | 11/1966 | Armeniades et al. | 259/4 |
| 3,357,955 | 12/1967 | Bryan | 260/78 R |
| 3,789,584 | 2/1974 | Iwasyk et al. | 55/201 |

*Primary Examiner*—Harold D. Anderson

[57] ABSTRACT

A continuous process for preparing polyamides is improved by providing a pressurized reactor in which steam is evolved along with some diamine volatilization while providing for diamine re-absorption by contact and mixing (with a static mixer) of the vapor and liquid phases in annular flow in the reactor.

2 Claims, 2 Drawing Figures

U.S. Patent   April 6, 1976   3,948,862

CONTINUOUS PROCESS FOR PREPARING ALIPHATIC POLYCARBONAMIDES

BACKGROUND OF THE INVENTION

This invention relates to the production of synthetic polymeric material and, more particularly, to an apparatus useful in producing such material.

Condensation polymers such as the polyamides were initially produced by batch processes in autoclaves, but continuous polymerization processes have been developed and are generally preferred for present day commercial operation. A continuous polymerization process is described by Taylor in U.S. Pat. No. 2,361,717. Taylor discloses continuously passing an aqueous solution of a diamine-dicarboxylic acid salt at super atmospheric pressure and at amide-forming temperatures continuously through a long tubular reactor divided into separate sections which are maintained at different conditions of pressure and temperature. The initial temperature-pressure conditions are such that the formation of steam is prevented and the rate of travel of the solution is such that a major portion of the salt is converted to polyamide. The reaction mass is then further subjected to amide-forming temperatures at pressures permitting the formation of steam, to remove water from the reaction composition as steam until the composition consists essentially of polyamide.

As a further simplification of Taylor's process the prior art discloses designs in which concentrated nylon salt solution is pumped under pressure directly into a stepped diameter flash tube in which water is flashed off as the nylon is polymerized. The deficiency of these designs is that in addition to steam flashing off in the flash tube a large amount of diamine is also vaporized since the salt solution is exposed to high temperatures and energetic boiling before the diamine has reacted. Since there is no subsequent step for reabsorbing the diamine, a large diamine loss occurs when the steam plus vaporized diamine are subsequently separated from the polymer. Of course, a major concern in the continuous polymerization of nylon is to avoid diamine loss, or, at least, to control it to a constant quantity, regardless of through put. This is essential not only because the diamine is an expensive intermediate but also because it is essential to maintain constant amine end content of the polymer in order to maintain constant molecular weight and acid dyeability.

It is, therefore, an object of the present invention to provide an improved process for continuous preparation of nylon whereby steam is disengaged from polyamide forming salt solution i.e., the reaction mass while the latter continues to polymerize in a stepped diameter reactor tube. The invention provides for recombining unreacted diamine, which has been vaporized with the steam in the reactor tube, with the reaction mass.

SUMMARY OF THE INVENTION

In a continuous process for preparing polyamides which includes the steps of passing an aqueous solution of a diamine-dicarboxylic acid salt at amide-forming pressures and temperatures through a reaction zone, the temperature and pressure conditions preventing the formation of steam while the salt travels through said reaction zone and is converted to polyamide, then passing the reaction mass through at least one other zone at amide-forming temperatures and at a pressure permitting the formation of steam and venting the steam until the composition consists essentially of polyamide and the pressure is substantially atmospheric the improvement comprising: reducing the pressure in said reaction zone permitting the formation of steam and vaporized diamine; and recombining a portion of said vaporized diamine with said salt for reaction therewith in said reaction zone.

DETAILED DESCRIPTION OF THE INVENTION

Figure 1:
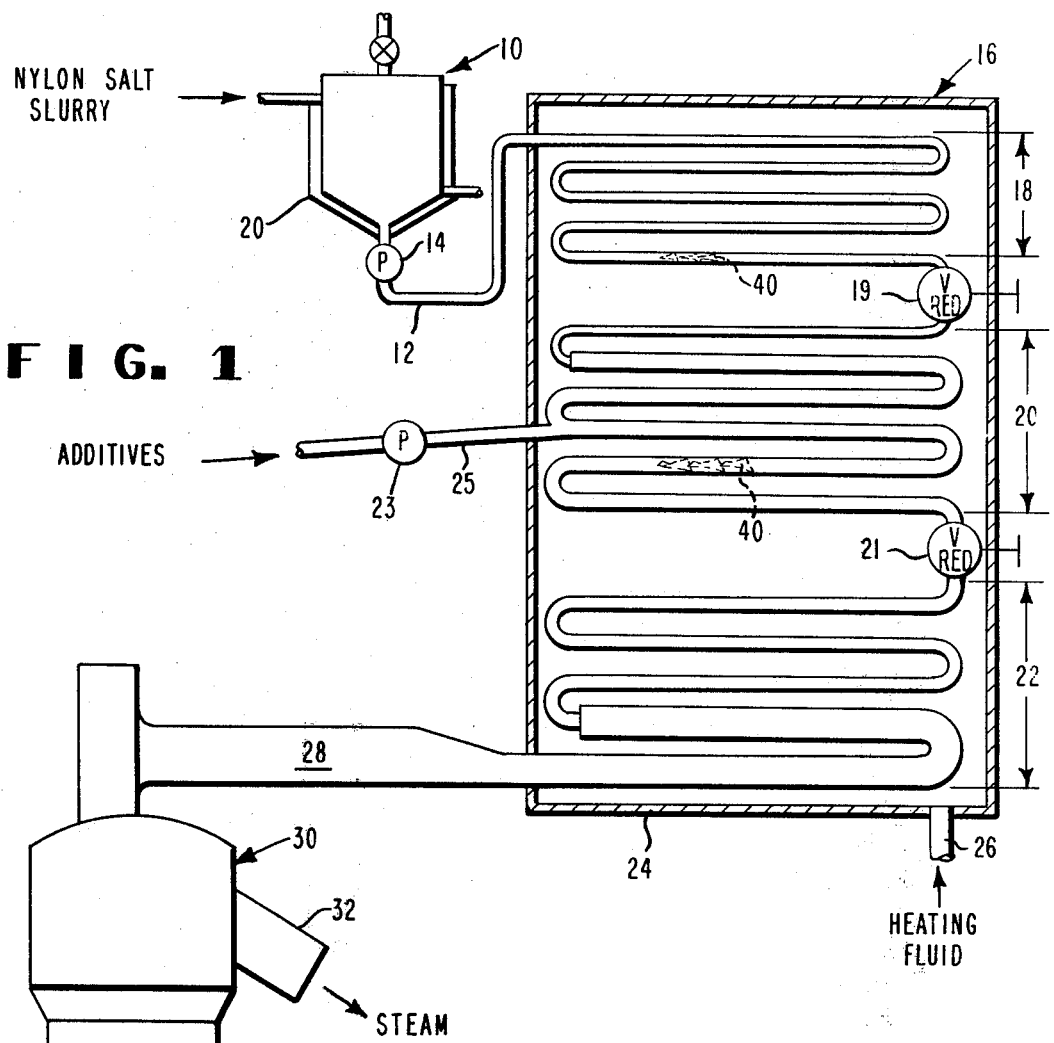
FIG. 1 is a schematic illustration of a continuous polymerizing system used in practicing the process of this invention.

The polyamide salt is prepared by reacting approximately stoichiometric amounts of diamine and dicarboxylic acid in water, to produce a solution or slurry of the polyamide salt. The salt solution is concentrated preferably to a 55% to 80% (by wt.) solution in evaporator 10, shown in the drawing. The evaporator is heated by a jacket 20 which may contain diphenyl-diphenyl oxide vapor or other conventional heating fluid.

The salt solution is pumped from evaporator 10 through conduit 12 by pump 14 to reactor-flasher 16 which consists of a reactor having two stages 18, 20 and a flasher 22. The reactor-flasher consists of sections of tubing which are series connected and of successively increased diameter. The reactor and flasher are preferably surrounded by a common heating jacket 24 to which heating fluid is supplied through pipe 26.

The output of reaction products from the flasher 22 is passed to a greatly enlarged section of horizontally disposed pipe 28 and then to separator 30 which is of the type described by Iwasyk et al. in U.S. Pat. No. 3,789,584. Steam which is disengaged from the polymer leaves separator 30 through steam vent 32 which may be attached to a condenser, vacuum pump, or aspirating jets (not shown), depending on the reaction conditions desired in separator 30. The polymer is discharged at 34 by conventional means (not shown).

It will be apparent that all of separator vessel 30 and pipe 28 must be provided with suitable heating jackets (not shown).

Located at the end of each stage 18, 20 of the reactor are pressure reducing valves 19, 21, respectively, which are globe control valves rated for high pressure and high temperature operation. Pressure in each stage of the reactor may be controlled by throttling these pressure reducing valves either manually or in response to control signals from their respective controllers (not shown).

Additives may be introduced into the polymer stream at a point in the second stage of the reactor by pump 23, through pipe 25.

Figure 2:
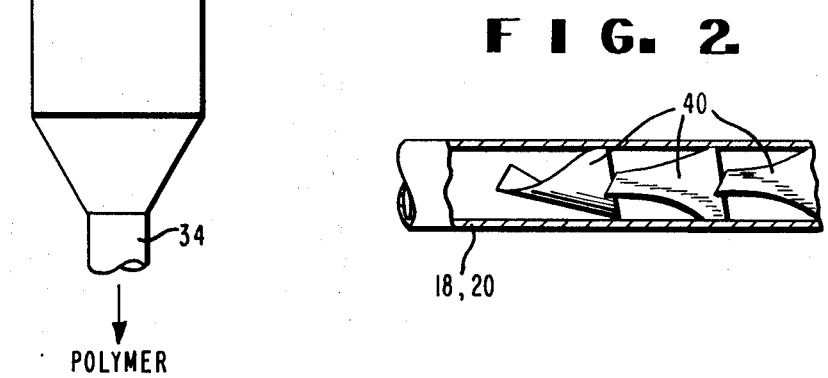
FIG. 2 is an enlarged schematic illustration of a portion of the reactor of FIG. 1 showing the static mixers in place.

Curved static mixing elements 40 are located in the first and second stages 18, 20 of the reactor. The second stage reactor piping 20, shown in section in FIG. 2, accommodates the curved elements 40 which extend to the walls of the pipe and divide it into two separate paths. While a plurality of mixing elements 40 are illustrated in each stage 18, 20, the number of elements, their geometry and their exact location may vary. In the second stage, they are advantageously placed downstream of injection pipe 25.

In operation, a nylon salt slurry or solution is fed to evaporator 10 where it is concentrated to a 55% to 80% solution which is then pumped to the first stage 18 of the reactor which operates at a temperature of about 310°C. The piping in the reactor is sized so that steam is continually evolved from the reaction mass (as soon as the feed solution boils) along with some unreacted diamine providing a two-phase annular flow up to the pipe 28 of the reaction mass along with steam and diamine vapors. A portion of the unreacted vaporized diamine is re-absorbed in the reaction mass by contact and mixing (with the static mixers 40). Pressure is maintained at a preselected level by adjusting valves 19 and/or 21. Sufficient residence time is provided in each stage of the reactor so that the polymerization reaction continues to within 85 to 90% of the equilibrium concentrations, at the existing temperature, pressure and reagent feed conditions.

The mixture of vapor, water and polymer then discharges from valve 21 into conventional flasher 22, where more steam is evolved as polymerization continues. The output from the flasher 22 empties into steam-polymer separator 30 where steam and dissolved water are removed and the polymer is pumped for further processing (e.g., to a spinning machine to form fibers, not shown).

EXAMPLE I

A small-scale continuous polymerizer (CP) of the type previously described is used to evaluate the use of static mixers to promote re-absorption of diamine vaporized with steam in the reactor.

The reactor consists of 65.6 ft. of ⅜ in. diameter stainless steel tubing (0.305 in. i.d.), followed by a flasher which consists of 11.7 ft. of ⅜ in. stainless steel tubing followed by 12.7 ft. of ½ in. diameter stainless steel tubing (0.430 in. i.d.). The flasher discharges into a steam-polymer separator. Between the two vessels, there is a pressure regulating valve. The reactor and flasher piping are immersed in a single liquid heating bath. An aqueous solution of PACM-12 [bis(4-aminocyclohexyl)methane (70 percent trans-trans stereoisomer) and dodecane dioic acid] salt is pumped into the reactor, under the pressure established by the pressure regulating valve. A static mixer is installed in the reactor tubing, 22 ft. from the inlet end. Supplemental water, representative of a delusterant side stream, is pumped into the reactor just upstream of the mixer. An aqueous solution of potassium phenyl phosphinate antioxidant (1 gm. salt in 99 gms. $H_2O$) is added with the nylon salt solution. The CP is operated according to the conditions listed in the Table for run No. 1.

For comparison purposes, run 2 is made with a slightly different CP arrangement. No mixers are employed. The reactor consists of 54.3 ft. of ⅜ in. i.d. stainless steel tubing, and the flasher consists of 12.1 ft. of ⅜ in. i.d. tubing and 11.1 ft. of ½ in. i.d. tubing. A pressure control valve is used between the reactor and the flasher. No additives are injected in this run. The operating conditions and diamine loss, calculated to comparable conditions, are listed in the Table as run 2.

It is noted that the use of the static mixer in the reactor cuts the diamine loss in half.

EXAMPLE II

Run 1 of Example I is repeated, using the same CP arrangement, but under different reactor-flasher space time conditions as listed in the table. As before, the pressure control valve is between the reactor and flasher.

For comparison, a run is made in a CP without static mixers, but having a slightly different piping arrangement. The reactor consists of 72.3 ft. of ⅜ in. i.d. stainless steel tubing, and the flasher consists of 11.7 ft. of ⅜ in. tubing and 11.1 ft. of ½ in. tubing. The operating conditions and results obtained are shown in the table, along with a calculated diamine loss for a 54% salt solution feed at 136 min. space time.

It is noted that the use of the static mixer cuts diamine loss approximately in half.

TABLE

| EXAMPLE NO. | I | | II | |
|---|---|---|---|---|
| Run No. | 1 | 2 | 3 | 4 |
| Internal Code | 23-6A | 14-7 | 23-1A | 17-3 |
| Mixer | Yes | None | Yes | None |
| Calculated Polymer Flow, g./min. | 24.2 | 17.8 | 17.2 | 15.4 |
| Space Time[1]-Reactor, min. | 40.0 | 45.9 | 56.4 | 52.0 |
| Flasher, min. | 29.7 | 36.3 | 41.8 | 84.5 |
| Total, R+F, min. | 69.7 | 82.2 | 98.2 | 136.5 |
| Salt concn., feed, % | 60.0 | 50.0 | 60.0 | 54.0 |
| Salt, excess amine ends[2], eq. | 5.3 | 33.0 | 5.3 | 20.0 |
| Reactor pressure, psig | 435 | 430–450 | 435–440 | 450–452 |
| Reactor temp., °C. | 290 | 290 | 292 | 290 |
| Phosphinate solution, g./min. | 2.42 | None | 1.8 | None |
| Extra $H_2O$ fed, g./min. | 1.8 | None | 1.6 | None |
| Effective salt concn., %[3] | 54.9 | 50.0 | 54.1 | 54.0 |
| Polymer Ratio, $NH_2$ to COOH ends, eq. | 0.845 | 0.918 | 0.890 | 0.830 |
| Diamine loss, eq. | 30.5 | 49.5 | 21.0 | 38.9 |
| Net saved by mixer, eq. | 19.0 | | 17.9 | |
| $NH_2$ Loss, calc. for 54% salt feed, eq.[4] | 27.8 | 42.1 | 20.8 | 38.5 |
| Standard space time, React+Flash, min.[5] | 80 | 80 | 136 | 136 |
| $NH_2$ Loss, calc. for std. space time, eq. | 23.0 | 43.0 | 18.5 | 38.5 |
| Std. $NH_2$, saved by mixer, eq. | 20.0 | | 20.0 | |

[1]Space time is the volume of a vessel divided by the volumetric thruput; it is a measure of residence time in the vessel.

[2]Amine-end concentrations are determined by standard analytical techniques; they are reported as equivalents per $10^6$ gm. polymer.

[3]The "effective salt concentration" is calculated from the salt solution fed (wt. %), making allowance for the dilution effect from reagent side streams.

[4]In order to eliminate extraneous effects of other variables on diamine loss, such as that of salt concentration,

TABLE-continued

| EXAMPLE NO. | I | II |
|---|---|---| the diamine loss to be expected at 54% salt feed concentration is calculated, based on earlier tests with this CP, and is reported in this line.

(5)Using the same method of calculation, diamine loss is calculated under "standard" space time thruput conditions, so that the final diamine losses reported reflect only the effect of the static mixer.

What is claimed is:

1. In a continuous process for preparing fiber-forming aliphatic polycarbonamides which includes the steps of passing an aqueous solution of a diamine-dicarboxylic acid salt through a reaction zone to form a reaction mass at amide-forming temperatures and at a pressure permitting the formation of steam along with a measurable amount of vaporized diamine and venting the steam and vaporized diamine until the composition consists essentially of aliphatic polycarbonamide and the pressure is substantially atmospheric, the improvement comprising: mixing said steam and vaporized diamine formed with said reaction mass to recombine a substantial portion of said vaporized diamine with said reaction mass for reaction therewith before the venting step.

2. The process as defined in claim 1, the portion of vaporized diamine recombined with said reaction mass being about 50 percent.

* * * * *